July 2, 1940. H. A. TEDTMAN 2,206,137
HOOD LOCK FOR AUTOMOBILES
Filed March 4, 1939
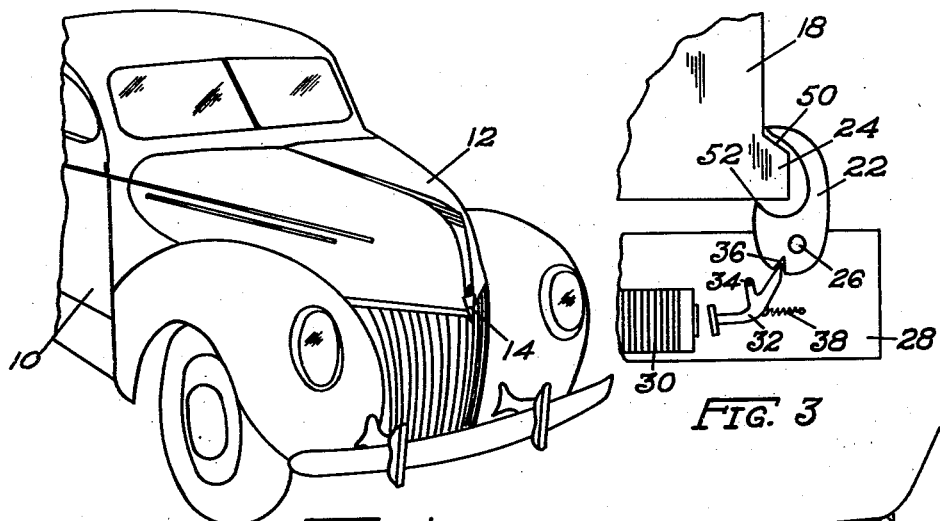
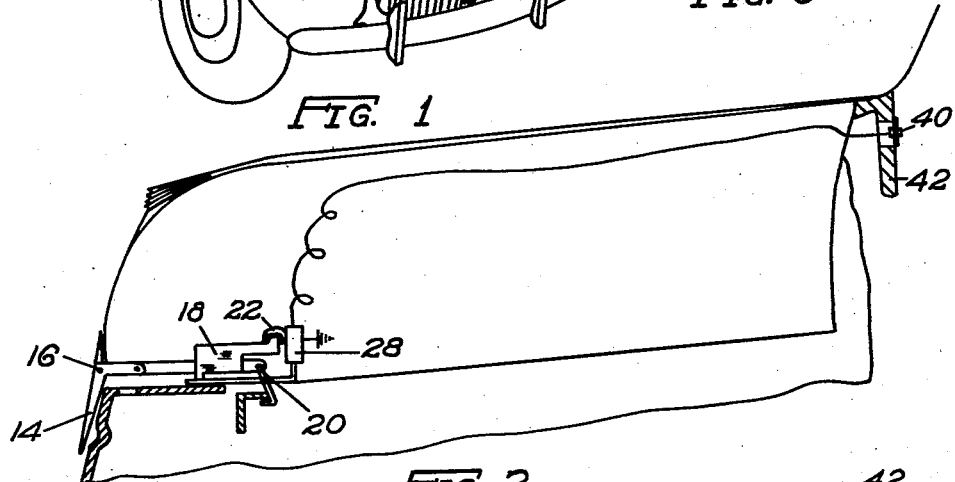
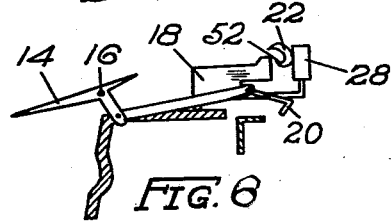
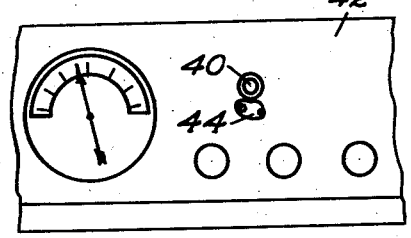
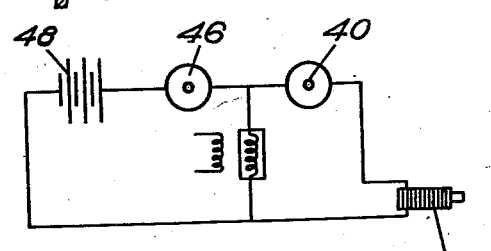
HENRY A. TEDTMAN
INVENTOR
PER
ATTORNEY Patented July 2, 1940

2,206,137

UNITED STATES PATENT OFFICE 2,206,137

HOOD LOCK FOR AUTOMOBILES

Henry A. Tedtman, Chicago, Ill.

Application March 4, 1939, Serial No. 259,759

1 Claim. (Cl. 292—201)

This invention relates to a new and improved hood lock for automobiles and has, for one of its principal objects, the provision of means for maintaining the engine hood in a locked relationship with the automobile body and release of this lock being made only from some strategic point on the interior of the automobile.

An important object of the device of this invention is to provide an engine hood lock that will protect the equipment and accessories situated beneath the hood of an automobile.

Another important object of this device is to provide an automatic engine hood lock for automobiles that is only unlocked by releasing means on the dash panel.

A further important object of this device is the provision of secure fastening means for automobile engine hoods and more particularly hoods that raise up in the front and pivot near the two extremities of the windshield.

Other and further important objects of the invention will be apparent from the disclosures in the accompanying drawing and following specification.

The invention, in a preferred form, is shown in the drawing and hereinafter more fully described.

In the drawing:

Figure 1 shows a modern automobile on which the device of this invention is to be positioned.

Figure 2 is a sectional view showing a hood latching means with the lock of this invention applied thereto.

Figure 3 is an enlarged detail of this lock.

Figure 4 is a part of a dash panel of an automobile showing hood lock releasing means.

Figure 5 is a wiring diagram of this device.

Figure 6 shows the latching and locking mechanism in an unlocked position.

As shown in the drawing:

The reference numeral 10 indicates generally an automobile having a hood 12 which raises up and back from the front, resembling a fish mouth. This hood 12 is equipped with a latch operating lever arm 14.

As best shown in Figures 2 and 6 the lever arm 14 when raised, pivots at 16 and in so doing, retracts the shouldered element 18 and also the actual latching means 20. It is the purpose of this invention to provide a means for holding the lever arm 14 in a closed position until release is desired from the interior of the automobile.

Present day motor vehicles have their batteries and many other pieces of readily removable equipment and accessories placed beneath the engine hood, and locking means for the hood is a great necessity. Car stealing will be reduced to a minimum with an efficient hood lock. The method used to steal an automobile seems to start by crossing wires behind the ignition lock, which are under the hood, and then to quickly break a window, climb in and drive off. With the hood lock of this invention, the thief would of necessity have to break the window first and then proceed to cross wires under the hood. This procedure obviously would attract too much attention and take too much time.

A locking means proposed is to have a latch element 22 to operate over the upper shoulder 24 of the element 18. As best shown in Figure 3, the latch element 22 is pivoted at 26 in the enclosed tamper proof cylinder 28. This cylinder 28 has enclosed therein a solenoid 30 which, when operated, pulls back the key element 32 which is pivoted at 34 and is retained in the notch 36 on the element 32 by the spring 38.

The solenoid is operated by a button 40 positioned on the dashboard 42. This push button 40 can be held in contact by the nubbed turning element 44 so as to insure release of the hood by a single person when necessary.

The solenoid is wired as shown in Figure 5 so that it will not operate unless the ignition key 46 is turned on, thus making a point which will further dissuade thieves from attempting to steal the automobile.

In operation, the ignition switch 46 must be on, allowing the current from the battery 48 to travel around through the solenoid when the push-button 40 is pressed. The solenoid in action pulls the element 32 out of the notch 36. This allows the lever arm 14 to be raised and thus draw out the element 18 because the latch element 22 just pivots up and out of the way with the retracting force on the beveled edge 50 of the shoulder 24. The solenoid can be released and the hood held up for any length of time. When the hood is lowered, and in turning the lever arm 14 to a closed position, it pushes back on the element 18 which in turn presses back on the point 52 of the latch element 22 and in so doing, forces the element 22 around into a locked relationship with the shoulder 24 and the key 32 snaps into the notch 36.

The operation is simple and such an apparatus can be produced very economically. It is believed that this is a much needed accessory for an automobile and that a lock for any type hood is a necessity. It is my purpose, therefore, not to limit this patent to the covering of hoods that raise up and back from the front, but also to cover the hoods that raise up on the sides. The adaptation of a solenoid controlled lock to any type of hood is a simple matter of design.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

An engine hood lock for automobiles having transversely hinged hoods, regular latching means for the hoods, comprising an angle piece stationarily pivotable at its angle, one end of the angle acting as a lever handle and the other end movably pivotable to an extension which in turn is pivoted to the pivotally mounted latching element and fastened to a shouldered element having an additional pivoting latch with a notch, a pivoting key to work in the notch and the key operated by a solenoid having control means on the dash panel, whereby a manual raising of the lever handle is allowed or rejected from the interior of the automobile.

HENRY A. TEDTMAN.